July 1, 1924.
G. E. QUINAN
1,499,476
MEANS INDICATING AVERAGE RATE FLOW OF ENERGY
Filed Aug. 5, 1918  3 Sheets-Sheet 1
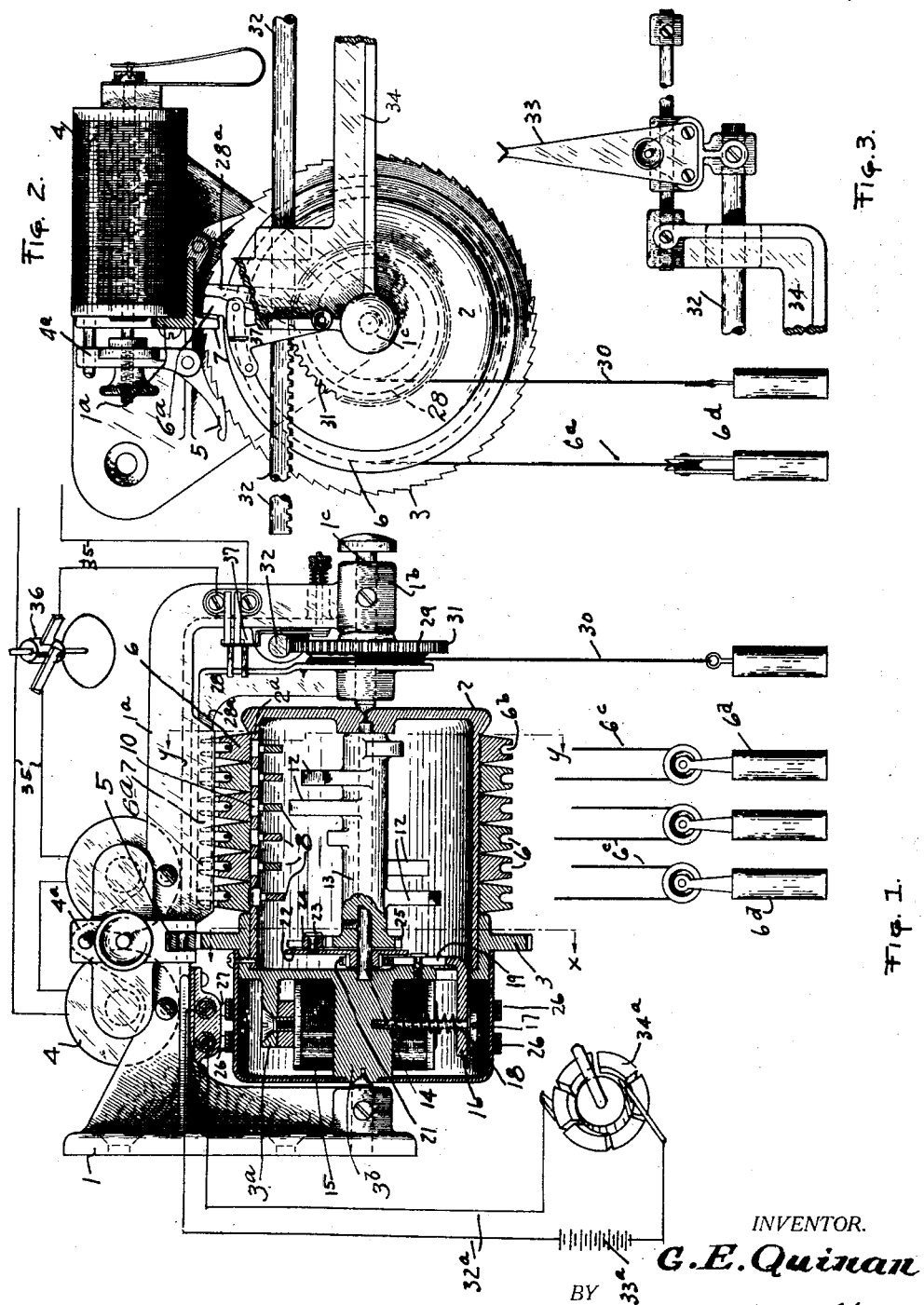
INVENTOR.
G. E. Quinan
BY
Fred P. Gorin
ATTORNEY.

July 1, 1924.

G. E. QUINAN 1,499,476

MEANS INDICATING AVERAGE RATE FLOW OF ENERGY

Filed Aug. 5, 1918

INVENTOR.
G. E. Quinan.
BY
Fred P. Gorin
ATTORNEY.

July 1, 1924.
G. E. QUINAN
MEANS INDICATING AVERAGE RATE FLOW OF ENERGY
Filed Aug. 5, 1918
1,499,476
3 Sheets-Sheet 3
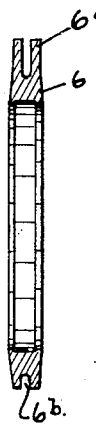
Fig. 6.
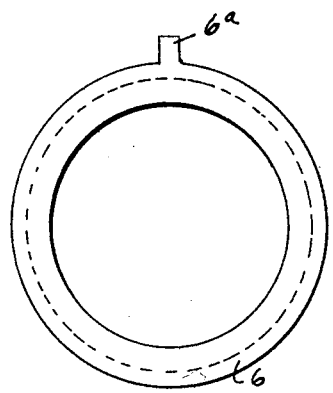
Fig. 7.
Fig. 8. Fig. 9. Fig. 10. Fig. 11.
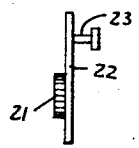 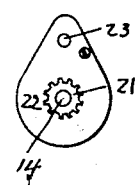 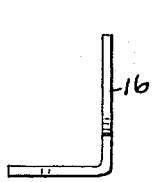 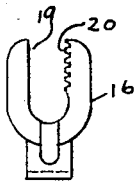
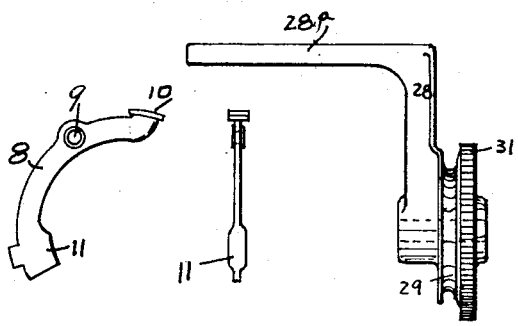
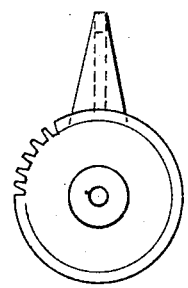
Fig. 15.  Fig. 14.  Fig. 13.  Fig. 12.
INVENTOR
G. E. Quinan
BY
Fred P. Gorin
ATTORNEY Patented July 1, 1924.

1,499,476

UNITED STATES PATENT OFFICE.

GEORGE E. QUINAN, OF SEATTLE, WASHINGTON.

MEANS INDICATING AVERAGE RATE FLOW OF ENERGY.

Application filed August 5, 1918. Serial No. 248,430.

*To all whom it may concern:*

Be it known that I, GEORGE E. QUINAN, citizen of the United States, residing at Seattle in the county of King and State of Washington, have invented certain new and useful Improvements in Means Indicating Average Rate Flow of Energy, of which the following is a specification.

The object of my invention, broadly stated, may be said to be the providing of a simple, but accurate means, for measuring the synchronous, proportional amounts of motion of two independent meters, or other driven instrumentalities, in order to determine, and express, the average rate of one meter occurring during predetermined, successive, equal, overlapping amounts of motion of the other meter.

The purpose of such measurements is illustrated by the following examples:

1. To determine the maximum average amount of electrical energy required for satisfying the maximum average demand of a consumer during any given period of time.

2. To determine the maximum average rate at which units of steam are used per kilowatt-hour by an engine driving a dynamo.

3. To determine the maximum average units of oil consumed per unit of steam produced.

Since the method of procedure and theory of operation are the same in each case, it will suffice in describing the practical working of my invention to explain its application or indicating the maximum average demand of electricity during given units of time.

My contention is that an efficient meter for the latter purpose should register the average peaks maintained during consecutive units of time, instead of registering merely the peaks attained at the end of each consecutive unit.

My invention may be described in a general way as consisting of means for producing a record similar to that which would be obtained by cooperatively combining a plurality of independent graphometers, all registering the same demand during predetermined equal units of motion of a second measuring instrument; the graphometers being thrown into action successively at equal intervals corresponding to aliquot parts of said predetermined units of motion of said second instrument, and each graphometer operating for a period equal to said predetermined unit of motion of said second measuring instrument of motion. The indications of the graphometers succeeding each other in rotation.

Assuming, for example, the graphometers to be controlled by a kilowatt-hour-meter and the second instrument to be a clock, I thus provide means for registering correctly the average peaks of demand of electricity maintained during the entire given units of time, as for instance, five minute periods, in place of means registering merely the peaks attained at the end of each unit of time.

In the drawings,

Fig. 1 is a side elevation of my device with parts in section and the actuating mechanism being shown diagrammatically;

Fig. 2 is an end elevation of the same parts;

Fig. 3 is a fragmentary elevation of that right hand portion of Fig. 2 omitted from the latter;

Fig. 6 is a cross sectional elevation showing details of one of the so called "rings" of my device;

Fig. 7 is a side elevation of such ring;

Figs. 8 to 15 inclusive show other details of my device; and

Figure 16:
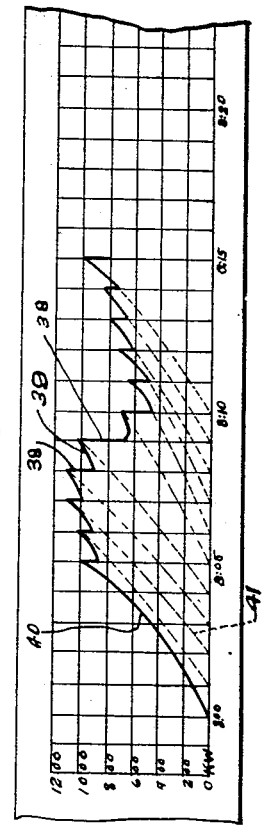

Fig. 16 shows a fragment of a continuous moving chart of the ribbon type calibrated to read in kilowatts.

In order to more readily understand the working of, and new results obtained by my invention it will be convenient to refer briefly to the operation of standard meters at present generally used for making measurements of a maximum average demand of electricity. Such a meter is found in that commercially known as a "graphometer."

As well known, this instrument comprises a calibrated chart moved by a clock work in one direction, and a pen transversely moved over the chart by a kilowatt-hour meter, thus drawing the oblique curves across the chart; the transverse motion of the pen being proportioned to the number of revolutions of the disk of the kilowatt-hour-meter, by which the pen is controlled. Assuming such a meter to start at 8:00 o'clock, the pen is returned to zero position at 8:05, and then is again moved across the chart for another five minutes. The peak of kilowatt hours consumed during the consecutive five minute units is indicated by the position of the pen at the end of each five minute units; but the meter does not indicate what the demand was for the five minute periods from 8:01 to 8:06, or from 8:02 to 8:07, etc., which information is essential, and without which the record given by the meter is inadequate.

In other words, such a device is inadequate as will be apparent by comparing the record made by it, with the record made by my device as shown by Fig. 16. In the latter the solid line represents the record made by my device; and the connecting broken lines 41 show the operation of the individual elements producing such record.

It should be noted that these broken lines are not a part of the record so being expressed, and that the individual elements actually record at only the step portions 39 of the graph. Thus each element acts of itself in the same way as the ordinary graphometer, but only the vital last part of the record contributes to the making of my average full line graph 40.

Note further that while from an ordinary graphometer's record, if used for indicating the same demand for the same period, it would appear that the greatest demand during the period from 8:05 to 8:10 was about 700 kilowatt, the true fact is, as shown by the record made by my device that at 8:06 and again at 8:09 the greatest demand was about 1000 kilowatt, and at 8:07 and 8:08 the greatest demand was about 1100. The discrepancy between the records of the two instruments is due to the fact that the graphometer permits the pen to drop back to zero, manifestly a false initial point, for, as seen from Fig. 16, if the pen had been continuously operated to indicate the demand for the period from 8:01 to 8:06 it would indicate an increase to 1000 kilowatt instead of a drop. Indeed a substantial part of the five minute period from 8:05 to 8:10 was consumed in the graphometer by requiring the pen-operating devices to recover the position of the pen lost by dropping it arbitrarily to zero, and starting again from zero at the end of 8:05.

My device comprises a supporting frame 1, carrying the operating parts. The frame 1 is made with an extended arm $1^a$, which terminates at its outer end in a bearing $1^b$. A hollow drum 2 has fixedly mounted on one end a ratchet wheel 3, the latter being made with a bracket $3^a$ and a hub $3^b$. The hollow drum 2 is rotatably mounted at one end in said frame by an adjustable pivot-pin $1^c$ which passes thru the bearing $1^b$, and the other end of the drum is supported by a similar pin bearing in the hub $3^b$ of said ratchet wheel 3. The bracket $3^a$ of the ratchet wheel 3 supports an electro-magnet 15. Another electro-magnet 4 is mounted upon the frame 1 and has an armature $4^a$ which carries a pawl 5 engaging with the ratchet wheel 3, and serves to rotate the latter, one tooth at a time, whenever the electro-magnet 4 is energized. The number of teeth of the ratchet wheel 3 is determined relatively to the step by step motion to be given to the drum 2.

On the drum 2 are revolubly mounted a series of six rings 6, each having a projecting lug $6^a$. Each of these rings is grooved as at $6^b$ to receive a cord $6^c$, suspending a weight $6^d$. These cords and weights are so arranged as to tend to hold and return the rings 6 to their initial positions, respectively, in which position the lugs $6^a$ of said rings bear against a rib 7 of the frame 1, and as apparent the rings may be given only a partial revolution.

It is to be understood that the weights $6^d$ merely represent a species of power for revolving said rings, and thus other means may be substituted for said weights $6^d$.

Figure 5:
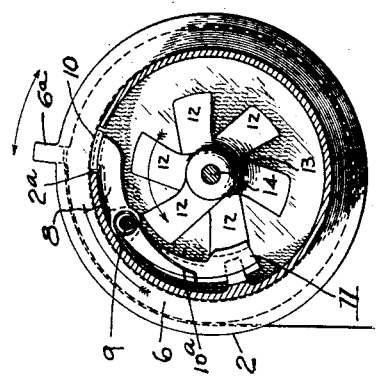
Fig. 5 is a cross sectional elevation taken on the line $y$—$y$ of Fig. 1.

A series of clutch-levers 8 are pivoted upon a longitudinal shaft 9 within the drum 2 (see detail in Figs. 5 and 15) said clutch-levers being related in position and movement to the rings 6. As shown in Figs. 5 and 15, each clutch-lever 8 has a shoe 10 which normally projects thru an opening $2^a$ in the drum 2, and engages with the inner surface of its related ring 6 thereby locking the latter with the drum 2. Springs $10^a$ hold the clutch-levers 8 yieldingly in their normal positions. The other end of each of the clutch-levers 8 is provided with a projection 11 which is adapted to cooperate with the adjacent one of the radial cam-arms 12 of the cam-shaft 13, rigidly mounted on a shaft 14, journalled coincidentally with the axis of rotation of the drum 2.

Figure 4:
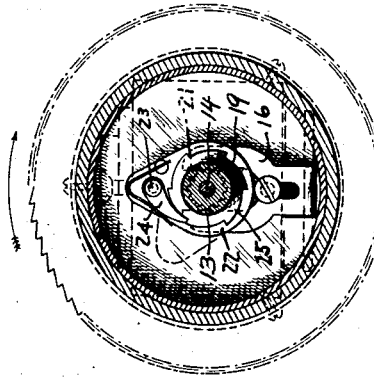
Fig. 4 is a cross sectional elevation taken on the line $x$—$x$ of Fig. 1.

The shaft 14 is rotated by devices operated by the electro-magnet 15 arranged as follows: A rack-bar 16 (see Fig. 4) constitutes the armature of the electro-magnet 15 (see detail of this rack-bar in Figs. 10 and 11) and it is moved upwardly each time the electro-magnet is energized. A pin 17 and coil-spring 18 (see Fig. 1) regulate the movement of said rack-bar 16. The latter is forked as shown at 19 in Fig. 11 and one of its arms is provided with teeth 20, which engage one side of the pinion 21, an integral part of a pawl-plate 22, which is mounted loosely upon the shaft 14. On the pawl-plate 22 is pivoted a pawl 24 by a pin 23 and such pawl engages with a ratchet-wheel 25, an integral part of the cam-shaft 13. Each time the rack-plate 16 is moved by the electro-magnet 15, the pinion 21 and therewith the pawl-plate 22 are operated to give the cam-shaft 13 one-sixth of its complete revolution, and by which the rings 6 are successively moved as explained below. Since the electro-magnet 15 moves with the drum 2 slip rings 26 are used to make contact between the latter magnet and the brushes 27, which are mounted upon, and insulated from the frame 1.

An arm 28 is revolubly mounted upon the pivot-pin 1ᶜ and the hub of this arm is provided with an integral grooved sheave 29 which carries a cord and weight 30, the latter holding said arm 28 against the lug 6ᵃ of the leading ring 6. The sheave 29 is made with an integral gear 31, which engages with a horizontally slidable rack-bar 32. The latter carries a pen 33 which makes the record graph. The rack-bar 32 is supported in bearings provided by the extension frame portion 34 of the frame 1.

The arm 28 is provided with a perpendicular extension 28ᵃ extending parallel with the arm 1ᵃ of the frame 1, and with the rib 7 of said arm 1ᵃ. The lugs 6ᵃ of the rings 6 are normally in contact on one side with said rib 7, and on the other side with said perpendicular extension 28ᵃ of the arm 28.

The electro-magnet 15 is energized thru the slip-rings 26 and brushes 27 and circuit wires 32ᵃ by a source of electric energy 33ᵃ and an intermittent contact-maker 34ᵃ, which in the illustration of the drawings, is assumed to be operated by clockwork, but any other convenient means may be substituted in conformity with the use to which my device is to be put.

The electro-magnet 4 is connected by means of circuit-wires 35 thru an intermittent contact-maker 36, driven by a kilowatt-hour-meter, so that whenever a predetermined quantity of electric energy has passed thru the latter, this magnet 4 will be energized, thereby causing the pawl 5 to engage with, and partially rotate the ratchet-wheel 3 and thus the drum 2.

A safety switch 37 may be provided in the circuit of the wires 35, and is adapted to throw off the current whenever the arm 28 has revolved to its limit, in order to prevent any injuries to the device.

My device operates as follows:

Each of the clutches 8 except one, engages with its related ring 6, and assuming the parts to be positioned as shown in Fig. 1, the ring not so engaged will be the one farthest to the left.

Those of the rings which are in clutch will rotate with the drum 2, while the ring not in clutch, being loose on the drum, is held by its cord and weight 6ᶜ and 6ᵈ in its initial position, or, in other words against rotating with the drum 2.

The electro-magnet 15 is energized once during each of the successive minutes by the make-and-break 34ᵃ operated by the clock mechanism, thus the cam-shaft 13 will be given a partial rotation at intervals causing its cam arms to release one of the rings 6 and to engage another thereof. That one of the rings which is released is returned to its initial position by its cord and weight.

The electro-magnet 4 is energized at intervals by the kilowatt-hour-meter, and thus causes the periodic partial rotation of the drum 2, and therewith such of the rings 6 as are in clutch. That one of the rings 6 which has been advanced the farthest has its lug 6ᵃ in contact, for the time being, with, and moves the arm 28, in so doing rotating the gear 31, advancing the rack-bar, carrying the pen 33.

Each of the rings 6 will be in clutch for a full five minute period, the duration of the travels of the rings overlapping and out of clutch one minute.

There will be at all times five of the rings 6 in clutch. The periodic forward movement of the leading ring advances the arm 28 and thus causes the pen to make an oblique mark as at 39 in the graph Fig. 16.

When the ring which has moved the arm 28 is released it will permit the latter to drop back until stopped by contact with the lug 6ᵃ of the next leading ring 6. Such drop of the arm 28 causes the pen to make a perpendicular line as 38 in the graph Fig. 16.

The first part of the graph illustrated in Fig. 16 represents the starting of my device, which is assumed to be at 8 o'clock, and the line 40 made by the pen between 8:00 and 8:05 will be a continuous upward curve; the pen being moved only during this first period by the leading one of the rings 6.

When the arm 28 is permitted to drop back a short distance, due to the release of the leading ring, such will not affect the accuracy of the record since the next ring 6 has moved with the drum 2 for the past 4 minutes and its lug will take up the movement of the arm 28 for the remaining 1 minute of its travel; and in this way the successive rings will each in turn advance the pen and produce an accurate registration of the electricity consumed during the past five minute periods.

Thus I obtain by my invention in the example given an accurate record of the average rate of electricity consumed during successive overlapping periods immediately preceding the recording instant.

For convenience, in stating my claims I shall regard the rings 6 as motion-transmitting elements, and use the term "meters" as defining any instrumentalities the synchronous proportional amounts of motions of which is to be ascertained.

The advantages of electro-magnetically controlled means for moving the mechanism of the meter proportionately to the movement of the watthour meter, over purely mechanical means, are obvious. The watthour meter is a delicate instrument and its accuracy would be seriously impaired if called upon to do external work, that is, any work in addition to turning the little gear wheels of its own dial. My clock mechanism merely functions to make an electric contact, hence its accuracy is not impaired by having external work imposed upon it. Furthermore, the electro-magnet operates instantly, and thus causes the proper effect at the right instant of time, while in purely mechanically operated devices, such instant action can not be efficiently obtained. A still further advantage is, that by using an electro-magnet element in the meter actuating means the meter can be installed at a distance from the clock mechanism, thus permitting the control of a plurality of meters by one master clock, as would be most desirable in power stations and sub-stations in which a number of meters are installed.

I claim—

1. In a device of the class described the combination of a cylindrical drum revolubly mounted in a frame, a series of members normally loosely mounted on said drum, means for clutching a predetermined number of said members to said drum, power operated means for intermittently rotating said drum through a definite part of a revolution, means within the path of said members and movable thereby, a recording pen movably actuated by the last mentioned means, whereby a graph may be made to indicate the consumption of power as indicated by the movement of the said drum.

2. In a device of the class described the combination of a cylindrical drum revolubly mounted in a frame, a series of members normally loosely mounted on said drum, means for clutching a predetermined number of said members to said drum, power operated means for intermittently rotating said drum through a definite part of a revolution, means within the path of said members and movable thereby, a recording pen movably actuated by the last mentioned means, whereby a graph may be made to indicate the consumption of power as indicated by the movement of the said drum, independently and intermittently operated means mounted on said drum for successively releasing the said clutching means one at a time, whereby the leading loosely mounted member on the said drum is released at each intermittent operation of the clutch releasing means and the pen moving means within the path of the loosely mounted members is allowed to move backward into contact with the next following member.

3. A meter involving a rotary member responsive to the accumulations of units of a varying quantity, and a series of actuating members normally carried by and movable with said rotating member and successively influenced by a device responsive to the accumulations of units of a second varying quantity to periodically relieve said actuating members from the influence of the rotating member.

4. A meter comprising an indicating member, a rotating member responsive to the accumulations of units of a varying quantity, and a series of actuating members to actuate and operate the indicating member, said actuating members being normally movable with the rotating member, and being successively disconnected from the rotating member for a predetermined period thru the influence of a second varying quantity.

5. A meter comprising indicating means, a rotating element responsive to the accumulations of units of a varying quantity, and a series of actuating members normally clutched to the rotating member and adapted to operate the indicating means, the clutches of the actuating members being opened thru the influence of a second varying quantity for predetermined periods.

6. A meter comprising indicating means, a rotating element responsive to the accumulations of units of a varying quantity, and a series of actuating members normally clutched to the rotating member and adapted to operate the indicating means, the clutches of the actuating members being opened thru the influence of a second varying quantity for predetermined periods, and independent means to move the actuating members to a fixed point as their clutches are opened.

7. A meter comprising indicating means, a rotating element responsive to the accumulations of units of a varying quantity, and a series of actuating members normally carried by and movable with the rotating element to successively engage and operate the indicating means, said actuating members being influenced by a second varying quantity to relieve them from connections with the rotating element in succession.

8. In a meter, an indicating means, a rotating element responsive to the accumulations of units of a varying quantity, a series of rings having clutch connection with the rotating element and adapted to successively actuate the indicating means, and means whereby said rings may be successively disconnected from the rotating element for a predetermined period thru the influence of a second varying quantity.

9. In a meter, an indicating means, a rotating element responsive to the accumulations of units of a varying quantity, a series of rings having clutch connection with the rotating element and adapted to successively actuate the indicating means, means whereby said rings may be successively disconnected from the rotating element for a predetermined period thru the influence of a second varying quantity, and means whereby the disconnected rings may be moved in opposition to the movement of the rotating member and to a fixed point.

10. A meter comprising an indicating member, a rotating element responsive to the accumulations of units of a varying quantity, a series of rings arranged on said element and adapted to successively engage the indicating member to actuate the same, a clutch member for normally holding each ring in fixed relation to the rotating element, and means influenced by a second varying quantity for successively operating said clutches to hold them open for a perdetermined period.

11. A meter comprising an indicating member, a rotating element responsive to the accumulations of units of a varying quantity, a series of rings arranged on said element and adapted to successively engage the indicating member to actuate the same, a clutch member for normally holding each ring in fixed relation to the rotating element, means influenced by a second varying quantity for successively operating said clutches to hold them open for a predetermined period, and means for moving the actuating members in opposition to the rotating element as their clutches are opened.

12. A meter comprising an indicating means, a rotating element responsive to the accumulations of units of a varying quantity, a series of rings mounted on said element and successively engaging indicating means to actuate the same, a clutch normally holding each ring in normally fixed relation to the rotating element, and means influenced by a second varying quantity for successively opening said clutches for a predetermined period to disconnect the ring from the rotating element, and means whereby the ring within the influence of the second varying quantity is moved in opposition to the movement of the rotating element.

In testimony whereof I affix my signature.

GEORGE E. QUINAN.